United States Patent
Duong-Van

(10) Patent No.: US 7,092,355 B1
(45) Date of Patent: Aug. 15, 2006

(54) METHOD FOR CONTROLLING CONGESTED NETWORK FLOW

(75) Inventor: Minh Duong-Van, Menlo Park, CA (US)

(73) Assignee: Network Physics, Inc., Mountain View, CA (US)

( * ) Notice: Subject to any disclaimer, the term of this patent is extended or adjusted under 35 U.S.C. 154(b) by 0 days.

(21) Appl. No.: 09/343,936

(22) Filed: Jun. 30, 1999

(51) Int. Cl.
*H04J 1/16* (2006.01)

(52) U.S. Cl. .................. 370/230; 370/235; 370/252

(58) Field of Classification Search ................ 370/252, 370/230, 229, 412, 428, 230.1, 232, 235, 370/465, 468
See application file for complete search history.

(56) References Cited

U.S. PATENT DOCUMENTS

| | | | |
|---|---|---|---|
| 3,686,641 A | 8/1972 | Logan et al. | |
| 5,127,001 A | 6/1992 | Steagall et al. | |
| 5,193,151 A * | 3/1993 | Jain ........................... | 370/230 |
| 5,243,596 A * | 9/1993 | Port et al. ................... | 370/231 |
| 5,361,372 A * | 11/1994 | Rege et al. .................. | 370/229 |
| 5,457,679 A * | 10/1995 | Eng et al. ............. | 370/395.31 |
| 5,581,544 A * | 12/1996 | Hamada et al. ............. | 370/230 |
| 5,696,764 A | 12/1997 | Soumiya et al. | |
| 5,995,486 A * | 11/1999 | Iliadis ........................ | 370/229 |
| 6,031,818 A * | 2/2000 | Lo et al. ...................... | 370/216 |
| 6,192,028 B1 * | 2/2001 | Simmons et al. ........... | 370/390 |
| 6,338,090 B1 * | 1/2002 | Emmes et al. .............. | 709/234 |
| 6,377,546 B1 * | 4/2002 | Guerin et al. ............... | 370/230 |
| 6,405,256 B1 * | 6/2002 | Lin et al. ..................... | 709/231 |

OTHER PUBLICATIONS

John Nagle, "On Packet Switches with Infinite Storage," Network Working Group, Internet Engineering Task Force, RFC 970 (1985).

Van Jacobson and Michael J. Karels, "Congestion Avoidance and Control," Proceedings of SIGCOMM '88, ACM, Stanford, CA (Nov. 1988).

W. Stevens, "TCP Slow Start, Congestion Avoidance, Fast Retransmit, and Fast Recovery Algorithms," Network Working Group, RFC 2001 (Jan. 1997).

"Queueing Theory Notes," http://www.williams.cs.ncat.edu/queueing.htm (May 19, 1999).

Michael J. Martinez, "Fractal Flowing Online," ABCNEWS.com, http://204.202.137.113/sections/tech/CuttingEdge/fractals990316.html (May 19, 1999).

"Congestion Control," http://empire.lansing.cc.mi.us/courses/Wdavis/130/congestion.html (May 19, 1999).

W. Richard Stevens, "TCP/IP Illustrated, vol. 1: The Protocols," Addison-Wesley Publishing Company, pp. iii-xiv and 275-296 (1994).

Gary R. Wright and W. Richard Stevens, "TCP/IP Illustrated, vol. 2: The Implementation," Addison-Wesley Publishing Company, pp. vi-xviii and 817-1005 (1995).

\* cited by examiner

*Primary Examiner*—Andrew C. Lee
(74) *Attorney, Agent, or Firm*—Blakely, Sokoloff, Taylor & Zafman LLP

(57) ABSTRACT

A buffer size for a router configured to receive packets transmitted through a communications network is temporarily increased at a time instant corresponding to an onset of congestion of the router for a time period that may be approximately equal to a round-trip packet time in the network. The increase in buffer size may be accomplished by providing an auxiliary storage area for packets that would otherwise be stored in a queue at the router, for example an auxiliary storage area associated with a physical storage device external to the router.

3 Claims, 2 Drawing Sheets

METHOD FOR CONTROLLING CONGESTED NETWORK FLOW

FIELD OF THE INVENTION

The present invention relates to a scheme for congestion control/avoidance in communication networks that rely on packet switching techniques to transport information between nodes therein.

BACKGROUND

Many communication networks, such as the Internet, rely on packet switching technologies (e.g., X.25, frame relay, asynchronous transfer mode, etc.) to transport variable or uniform blocks (usually termed packets or cells) of data between nodes. The term packet will be used herein to collectively refer to any such block of information. Such networks generally perform two major functions: routing and congestion control. The object of routing is to deliver, correctly and sometimes in sequence, the packets from a source to a destination. The object of congestion control is to maintain the number of packets within the network (or a region or sub-network thereof) below a level at which queuing delays become excessive. Often, where queuing delays are significant, packets are dropped.

In essence, a packet switched network is a network of queues communicatively coupled together by communication links (which may be made up of various physical media). At each network node (e.g., a switch or router), there exists one or more queues of packets for each outgoing link. If the rate at which packets arrive and queue up exceeds the rate at which packets are transmitted, queue size grows without bound and the delay experienced by a packet tends towards infinity. Even if the packet arrival rate is less than the packet transmission rate, queue length may grow dramatically as the arrival rate approaches the transmission rate.

In an ideal case, network throughput, and hence network use, should increase to an offered load up to the physical capacity of the network and remain at capacity if the load is further increased. This ideal case, however, requires that all nodes somehow know the timing and rate of packets that will be presented to the network with no overload and no delay in acquiring this information; a situation which is not possible. If no congestion control is exercised, as the load increases, use increases for a while. Then, as the queue lengths at various nodes begins to grow, throughput actually drops. This is due to the fact that the queues are constrained to a finite length by the physical size of the memories in which they exist. When a node's memory (i.e., its queues) is full, it must drop (i.e., discard) additional incoming packets. Thus, the source is forced to retransmit these packets in addition to any new packets it might have. This only serves to worsen the situation. As more and more packets are retransmitted, the load on the network grows and more and more nodes become saturated. Eventually, even a successfully delivered packet may be retransmitted because it takes so long to get to its destination (whereupon it may be acknowledged by the destination node) that the source actually assumes that the packet was lost and it tries again. Under such circumstances, the effective capacity of the network is virtually zero.

Contrary to what one might believe, the solution to this problem is not to simply allow the queue lengths to grow indefinitely. Indeed, it has been shown that even where queue lengths are allowed to be infinite, congestion can occur. See, e.g., John Nagle, "On Packet Switches with Infinite Storage", Network Working Group, Internet Engineering Task Force, RFC 970 (1985). One reason that this is true is that packets are often coded with an upper bound on their life, thus causing expired packets to be dropped and retransmitted, adding to the already overwhelming volume of traffic within the network.

It is clear that catastrophic network failures due to congestion should (indeed, must) be avoided and preventing such failures is the task of congestion control processes within packet switched networks. To date, however, the object of such congestion control processes has been to limit queue lengths at the various network nodes so as to avoid throughput collapse. Such techniques require the transmission of some control information between the nodes and this overhead itself tends to limit the available network bandwidth for data traffic. Nevertheless, a good congestion control process maintains a throughput that differs from a theoretical ideal by an amount roughly equal to its control overhead.

In addition to imposing limits on the true available throughout of a network, conventional congestion control processes do not take into account the true nature of network traffic. Existing approaches have generally viewed network traffic (e.g., the generation of new packets to be injected into a network) as essentially random processes. However, recent work in the area of traffic modeling has shown that network traffic is in fact fractal in nature. None of the currently proposed congestion control methodologies capture or exploit this characteristic.

The concept of fractality can be illustrated in Cantor Sets. Consider a line segment of length 1 unit. Now divide this line segment into three equal parts and remove the middle third. Two smaller segments of length ⅓ unit remain. Now divide each of these segments into three again and remove the corresponding middle thirds. In this generation of line segments there are four separate segments, each of length ⅑ unit. This process can be repeated ad infinitum, with a basic pattern appearing in each generation of line segments at all scales. This construction of so-called Cantor Sets is fractal. Mathematically, the degree of fractality can be stated by a measure known as the fractal dimension.

Network traffic, including Internet traffic, exhibits the same sort of fractal properties as the Cantor Sets of line segments described above. That is, it has been discovered that when a measure of data units (e.g., bits) per time interval is plotted against time, a persistent behavior is noted at all time scales. So, a plot of bits/hour versus hours shows the same persistent pattern as a plot of bits/minute versus minutes, and bits/second versus seconds and so on. If traffic flow in a network were truly random (as had been postulated in the past and upon which assumptions current congestion control methodologies were based), then at some (large) time scale, burstiness should appear. This burstiness should then disappear as the time scale is reduced, resulting in a random distribution. The experiments mentioned above, however, have shown that this does not occur. Instead, the same persistent patterns of traffic flow that are present at large time scales are observed at small time scales. Furthermore, the traffic flow (i.e., the number of bytes per unit of time) is chaotic. The degree of chaoticness can by quantified by the mathematical concept called fractal dimension. With this range of fractal dimension, the applicant has discovered that the chaos of the traffic flow can be controlled using the methods described below.

As indicated above, current congestion control processes simply do not take the fractal network traffic characteristics into account and, therefore, cannot be expected to be optimum solutions to the congestion problem. What is needed therefore, is a congestion control scheme which does account for the fractal nature of network traffic flow.

SUMMARY OF THE INVENTION

A buffer size for a router configured to receive packets transmitted through a communications network is temporarily increased at a time instant corresponding to an onset of congestion of the router for a time period that may be approximately equal to a round-trip packet time in the network. The increase in buffer size may be accomplished by providing an auxiliary storage area for packets that would otherwise be stored in a queue at the router, for example an auxiliary storage area associated with a physical storage device external to the router.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Figure 1:
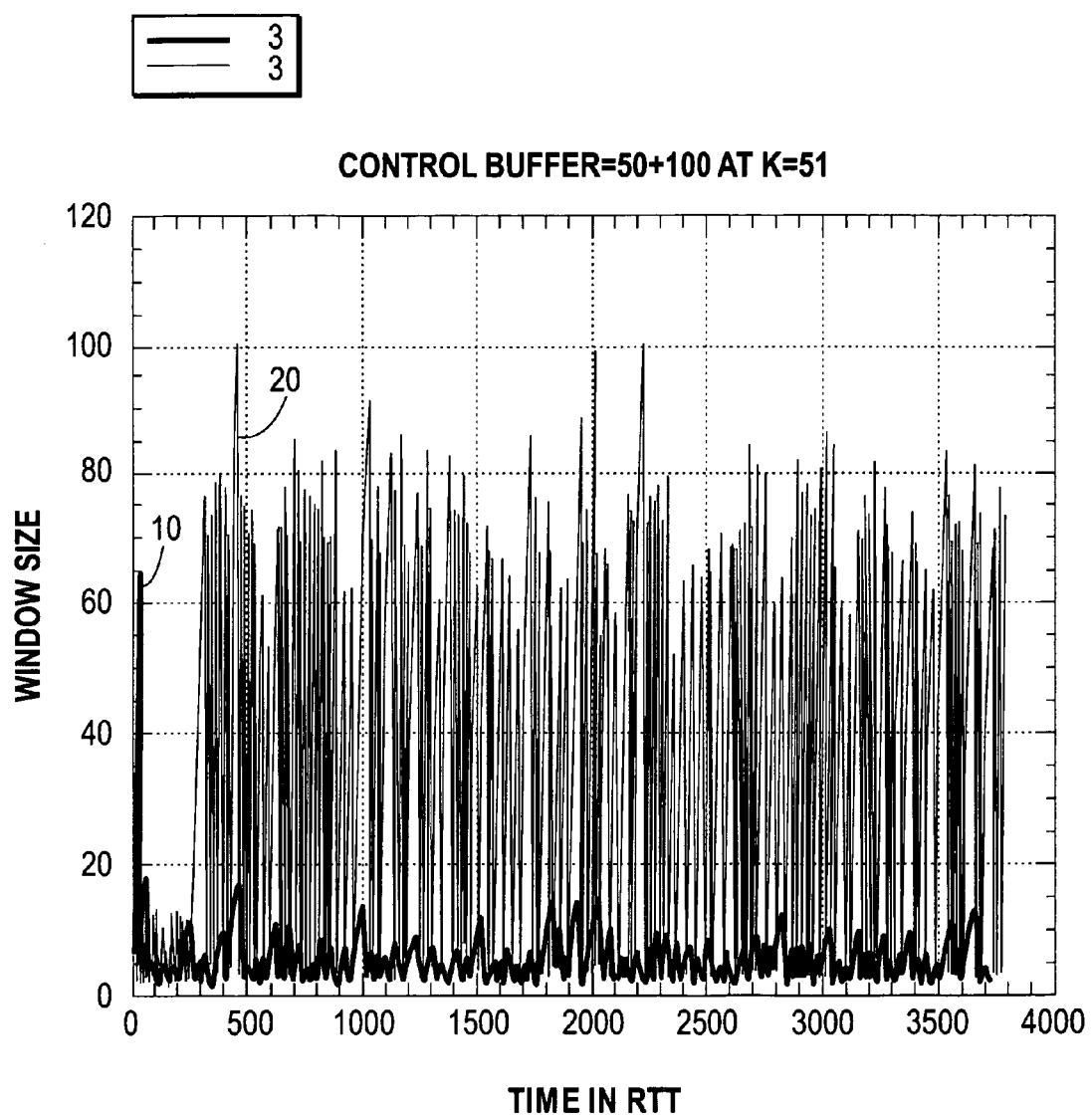
FIG. 1 illustrates a conceptual model of a queuing system.

A scheme for reducing or preventing congestion in packet switched networks is disclosed herein. Although discussed with reference to certain illustrated embodiments, upon review of this specification, those of ordinary skill in the art will recognize that the present scheme may find application in a variety of systems. Therefore, in the following description the illustrated embodiments should be regarded as exemplary only and should not be deemed to be limiting in scope.

To more fully appreciate the present methods, it is helpful to understand why network traffic is fractal in nature. Consider then a series of packet transmissions between a source and a receiver. Suppose these transmissions take place across one or more networks, through one or more intervening nodes, such as switches and/or routers. Suppose further that the transmissions are controlled using the well-known transmission control protocol (TCP), as is true for transmissions that take place across the Internet.

Very early in the development of the modern Internet, it was discovered that some control over the manner in which packets were injected into the network by the source was needed. Originally, TCP allowed a source to inject multiple packets into a network, up to a limit corresponding to a window or buffer size advertised by the receiver. Although such a scheme may work where the source and the receiver are connected to the same local area network, it was soon found that where routers having finite buffer sizes are disposed between the source and the receiver, problems arise as these routers soon run out of space to hold the incoming packets. To combat this problem Jacobson and Karels developed a "slow start" procedure wherein the source limits the rate at which it injects new packets into the network according to the rate at which acknowledgements of successful receptions are retuned by the receiver. Van Jacobson and Michael J. Karels, "Congestion Avoidance and Control", Proceedings of SIGCOMM '88 (Stanford, Calif., August 1988), ACM.

Under the slow start procedure, a so-called congestion window is added to the source's TCP. When a connection is established with a resource on another network, this congestion window is initialized to one segment (e.g., the segment or packet size advertised by resource, or a default packet size). Each time an acknowledgement is received, the congestion window is incremented and the source is allowed to inject a number of packets up to the minimum of the current congestion window size or the receiver's advertised window. Over time, the source's congestion window will grow exponentially until at some point the capacity of the intervening network is reached and some intermediate router will begin dropping packets. This is an indication to the source that its congestion window has gotten too large. See, e.g., W. Richard Stevens, TCP/IP Illustrated, Vol. 1: The Protocols (1994) and Gary W. Wright and W. Richard Stevens, TCP/IP Illustrated, Vol 2: The Implementation (1995).

At this point, and where the slow start process in run in concert with a conventional congestion avoidance procedure, the source resets its congestion window to one, and the process repeats up to the point at which the congestion window becomes half the size at which packet loss occurred. After this point, the congestion avoidance process takes over and begins incrementing the congestion window in a linear fashion (rather than in an exponential fashion as under the slow start process) in response to receiver acknowledgements.

This sudden change from an exponentially growing number of packets being injected to a linearly growing number of packets being injected, presents a discontinuity. Such discontinuities are observed at the intervening router for each of the connections it is servicing. Moreover, the discontinuities appear at random as there is no synchronization between the different sources injecting packets into the network. It is the interaction between the discontinuities that result from the operation of the TCP and the randomness at which they are manifest at the routers within the network that gives rise to the fractal nature of network (e.g., Internet) traffic.

While investigating the phenomena described above, the present applicant has discovered that if the congestion window is set to an arbitrary size and if the network traffic is very busy with respect to this window size, then after the onset of congestion, the size of the subsequent congestion window as a function of time remains consistently small. That is, without any intervention the congestion window of the source will remain smaller than that which could be used according to the available network bandwidth. Even if the "business" of the traffic flow is reduced, the congestion window will grow, but only to a point much smaller than that allowed by the network bandwidth. As a result, the end-to-end traffic flow is far below that which could be accommodated by the network. The present applicant has developed a method to exploit this observation so as to allow a source to make full use of the available network bandwidth. In essence, this method exploits the chaotic behavior of the network traffic; something which conventional congestion control processes simply do not do.

To overcome the problem of inadequately sized congestion windows leading to inefficient use of available network bandwidth, the present scheme adopts a counter-intuitive approach. Rather than have a packet source slow down (i.e., reduce the number of packets being introduced into system), the present scheme actually brings the system to the point of catastrophic failure (i.e., the point of congestion). Then, just prior to the onset of congestion (or at any point prior thereto in the general case), the router buffer size is momentarily "shocked" so as to momentarily increase its size. Thus, if the buffer had a size "B" just prior to the onset of congestion, then the buffer size would be momentarily increased to a size "C*B", where C can be any value larger than 1.

By "shocked" it is meant that the router is momentarily provided with an effective increase in buffer size, or serving rate, which relieves the burden on the system as a whole. Physically, this can be implemented in a variety of ways, including enlarging the buffer from which the router serves packets for a momentary period of time (determined by the effective servicing rate). The precise implementation scheme used is not critical to the present invention, however, in one embodiment an external memory is made available to the router for predetermined period of time and the router is allowed to use this memory to store packets received from the source.

The term shocked is also used to draw an analogy to the operation of heart defibrillators. Ventricular fibrillation is a condition wherein the heart undergoes a series of rapid, uncoordinated contractions, causing weak, ineffectual heartbeats. It has been discovered that fibrillation is, like network traffic flow, a chaotic process that exhibits fractality. Unlike pacemakers, which continuously impart an electrical signal to keep a heart beating properly (not unlike the scheduler of a queuing system), defibrillators pulse only one when a heart is undergoing ventricular fibrillation. The pulse is meant to shock the heart back into regular rhythm.

Like the action of the defibrillator, the present scheme imposes a shock on the system to clear congestion at the moment of its onset. This is a counter-intuitive procedure because ordinarily routers respond to congestion by trying to reduce the influx of packets. Under the present scheme, packets are continually input in order to bring the system to the point of congestion. That is, congestion is viewed as a desirable condition to promote efficient operation of the congestion control methods of the present invention.

As indicated above, in one embodiment shocking the system in the fashion contemplated herein is accomplished by temporarily providing an increased buffer for receiving packets. This temporary increase in buffer size can be implemented in a variety of ways. For example, one could hold a portion of the memory in which the router's receiving buffers regularly reside in reserve and allow that memory space to be filled on the temporary basis contemplated by the present scheme. Although this method would be suitable for purposes of the present invention, it would not necessarily be a preferred implementation because it seems paradoxical to hold back a portion of available (and in real-world systems always scarce) memory which could be used for other purposes.

So, rather than simply reserving a portion of available memory for the temporary buffer size increase, the preferred implementation of the present scheme employs an external memory which can be made available to multiple routers on a temporary or periodic basis. In other words, an external memory (or some other auxiliary storage area) can be communicatively coupled to a number of routers that will allow packets to be stored therein on a temporary basis. The packets are then serviced from this temporary storage location.

The truly dramatic increase in network traffic throughput provided by the present scheme is illustrated in FIG. 1. In the illustration, congestion window size for a packet source is plotted as a function of iteration time (which in this simulation is proportional to the round-trip time for a packet-ack transmission). Curve 10 represents a situation where the congestion window is initially set to 100, and an intervening router is simulated to have a buffer size of 50. That is, the source is allowed to transmit up to 100 packets, but the receiving router can only store 50 packets in its receive buffer. This represents a router under heavy load, and as can be seen in the drawing congestion results almost immediately. The congestion is illustrated by the dramatic decrease in congestion window size (which represents the number of packets that the source is allowed to transmit into the network). Within only a few iterations (representing a few transmission/acknowledgement cycles), the source is able to transmit only a small fraction of the initial number of packets.

In the same illustration, curve 20 represents the same situation where, just as the onset of congestion is reached (i.e., after a few iterations), the router buffer size is "shocked" in the manner contemplated by the present methods. As shown, although the subsequent moment-to-moment congestion window size varies (shown in the perturbations in the curve), the overall trend over time is much increased congestion window over that which was present before. In this example, the buffer size was momentarily increased from 50 to 100 and the result is that the congestion window grows (and, importantly, remains) to almost the initial size of 100 again.

In interpreting these results, it is important to remember that the increase in buffer size is only temporary. That is, the router buffer size remains at 100 for only a moment; approximately equal to one iteration (i.e., one round-trip time period). Afterwards, the buffer is returned to its original size of 50. Despite this return to the original buffer size, the congestion window remains significantly larger than it was during the period of congestion. Therefore, the number of packets being transmitted by the source is far greater than it was during the congestion period and, as shown by curve 20 in the illustration, no further congestion is experienced (it is important to realize that this curve represents only a single traffic flow and that under real world conditions it is expected that the random nature of other traffic flow arrivals and use of a common buffer therefor will affect the congestion properties of this flow, requiring additional "shocks").

Figure 2:
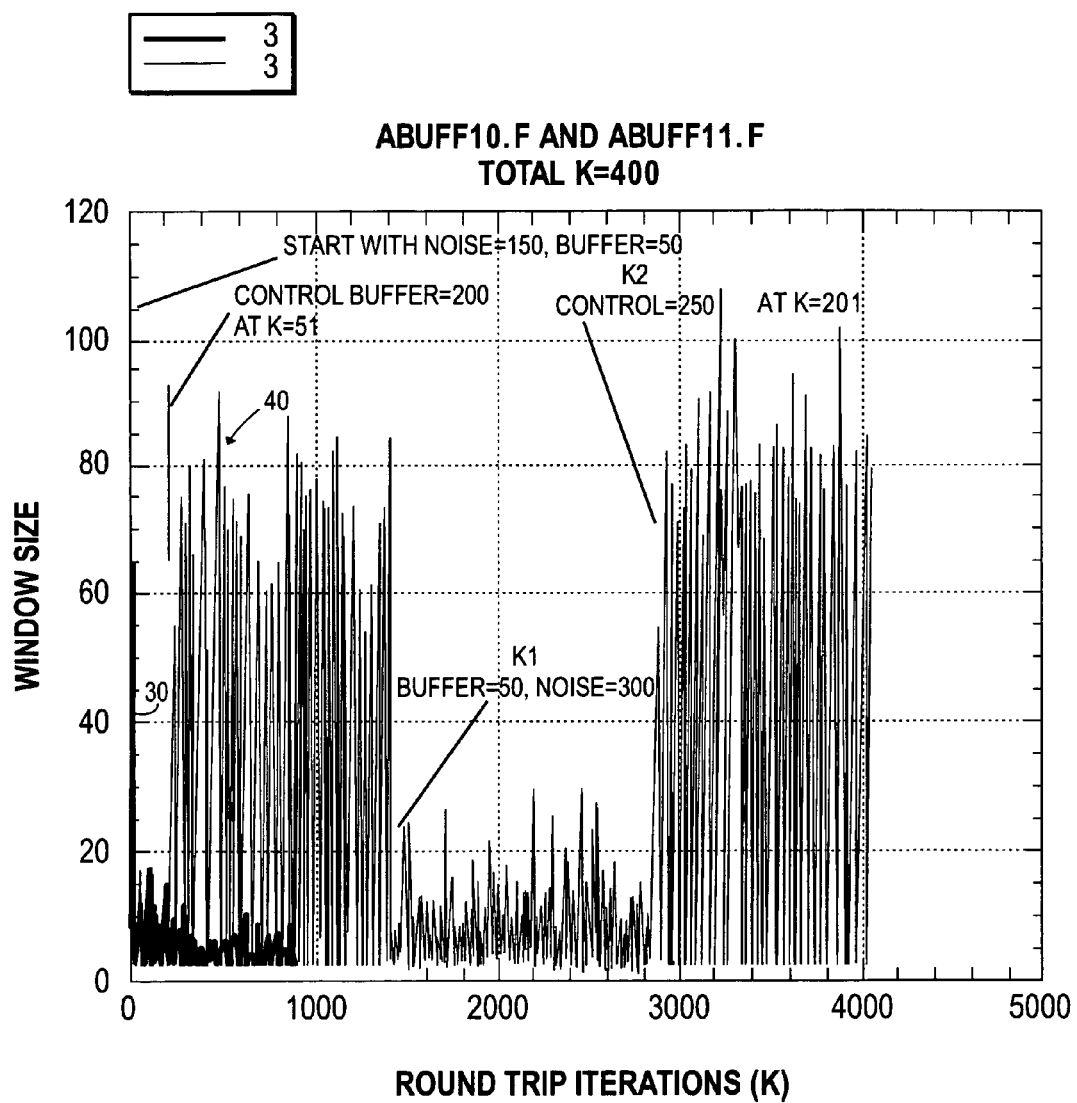
FIG. 2 is a graphical representation of queue lengths that may be experienced within the queuing system of FIG. 1 under constant load both before and after application of a temporary increase in queue size in accordance with an embodiment of the present invention.

A second illustration of the effects of "shocking" a network in the present manner is illustrated in FIG. 2. In this example, curve 30 represents the source window size (specified as "noise" in the diagram) as a function of round-trip iterations (K) for the case where congestion is allowed to occur without intervention. Here, the initial congestion window size was set to 150 and the buffer size was set to 50. As before (see FIG. 1), congestion occurs almost immediately and the congestion window is dramatically reduced in size (meaning that the source transmits few, if any, packets into the network).

In the same illustration, curve 40 represents the situation where, just as the onset of congestion is reached (i.e., after a few iterations, K=51), the router buffer size is "shocked" in the manner contemplated by the present methods. As shown, although the subsequent moment-to-moment congestion window size varies (shown in the perturbations in the curve), the overall trend over time is much increased congestion window over that which was present before. In this example, the buffer size was momentarily increased from 50 to 200 and the result is that the congestion window grows (and, importantly, remains) to approximately 80.

Now to demonstrate the sensitivity to initial conditions of this system (another feature of chaotic systems), at a point K1 the traffic flow is doubled. By this point the buffer size has returned to 50 from its momentary increase to 200 at K=51. Notice that once again the onset of congestion is almost immediate and the congestion window is reduced to less than 20 from its prior value of near 80. One might wonder why the congestion window is not the same size as was the case prior to K=51, as the buffer size is the same. The answer lies in the fact that prior to the onset of congestion at K=51, the congestion window was set at a point different than that which was present prior to the new onset of congestion. This sensitivity to initial conditions is a characteristic of chaotic systems and provides further evidence of the need to approach congestion control solutions with such considerations in mind.

At a point K2, the system is shocked so as to momentarily increase the buffer size to 200 once again. Notice again how the congestion relief is almost immediate, even in the face of the increased traffic flow. The congestion window returns to approximately the same size (with minor perturbations) as it had prior to the doubling of the traffic flow (used to simulate a nonlinear transition that may be expected in a real world router), thus indicating the repeatability of the present congestion control methods. After shocking the buffer, it can be allowed to return to its normal size (e.g., 50), without causing the congestion window to decrease in size (i.e., without affecting the rate at which the packet source can inject packets into the network).

Thus a scheme for controlling congestion in packet switched networks has been described. Although the foregoing description and accompanying figures discuss and illustrate specific embodiments, it should be appreciated that the present invention is to be measured only in terms of the claims that follow.

What is claimed is:

1. A method, comprising temporarily increasing an effective serving rate, for a router configured to receive and transmit packets in a communications network at a time instant corresponding to an onset of congestion of the router, and thereby increasing the number of packets that a source, which provides packets to the router, is allowed to transmit into the communications network, wherein the effective serving rate is increased for a time period comprising a round-trip time interval for a packet transmitted in the network.

2. The method of claim 1 wherein increasing the effective serving rate comprises providing an auxiliary storage area for packets that would otherwise be stored in a queue at the router.

3. The method of claim 2 wherein the auxiliary storage area is associated with a physical storage device external to the router.

* * * * *